2,948,749

PRODUCTION OF 1,2,3,4-TETRAHYDRO-1-NAPHTHOIC ACID

Jay S. Buckley, Jr., Groton, and Rudolph G. Berg, Noank, Conn., assignors to Chas. Pfizer & Co., Inc., New York, N.Y., a corporation of Delaware No Drawing. Filed Oct. 13, 1955, Ser. No. 540,339

4 Claims. (Cl. 260—515)

This invention relates to a new and novel process for the preparation of 1,2,3,4-tetrahydro-1-naphthoic acid. In particular, this valuable process involves the selective catalytic hydrogenation of 1,2,3,4-tetrahydro-4-oxo-1-naphthoic acid to 1,2,3,4-tetrahydro-1-naphthoic acid. 1,2,3,4-tetrahydro-1-naphthoic acid is useful as an intermediate in the preparation of tetrahydrozoline. Tetrahydrozoline is a valuable pressor agent which is the subject of copending application Serial No. 431,618, filed May 21, 1954, by Martin E. Synerholm et al., now U.S. Patent No. 2,731,471.

The definitive systematic name for tetrahydrozoline is 2-(1,2,3,4-tetrahydro-1-naphthyl) imidazoline. Its formula is given below.

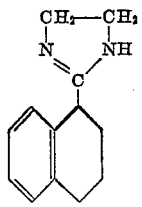

The preparation of tetrahydrozoline involves the heating of 1,2,3,4-tetrahydro-1-naphthoic acid or one of its esters with ethylenediamine according to techniques well known in the art for the preparation of 2-substituted imidazolines. The required 1,2,3,4-tetrahydro-1-naphthoic acid has been prepared in the past by the chemical reduction of 1-naphthoic acid with sodium and alcohol. However, this type of a reduction is quite hazardous, even on a large laboratory scale, and cannot be considered for commercial production. It has not been possible to control the catalytic reduction of 1-naphthoic acid with sufficient precision to make this a practical method for producing this compound.

An alternative route to 1,2,3,4-tetrahydro-1-naphthoic acid known in the art involves cyclization of α-phenylglutaric acid to 1,2,3,4-tetrahydro-4-oxo-1-naphthoic acid followed by reduction of the keto group. This process is illustrated schematically below.

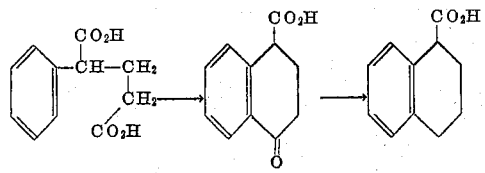

Heretofore, two factors have mitigated against the commercial application of this process. One is the unwieldiness and expense of known methods for the reduction of 1,2,3,4-tetrahydro-4-oxo-1-naphthoic acid, and the other is the lack of a simple and efficient method of preparing α-phenylglutaric acid. Suitable processes are known in the art for carrying out the cyclization step. A copending application Serial No. 540,338, filed October 13, 1955, presents a new and useful synthesis of α-phenylglutaric acid. The object of this invention, therefore, is to provide an economical and convenient process for the reduction of 1,2,3,4-tetrahydro-4-oxo-1-naphthoic acid to 1,2,3,4-tetrahydro-1-naphthoic acid.

Prior art processes for the reduction of 1,2,3,4-tetrahydro-4-oxo-1-naphthoic acid involve chemical reductions of the Clemmensen type using zinc amalgam and hydrochloric acid. Clemmensen reduction suffers from a number of disadvantages particularly from the point of view of commercial operation. The desired reduction of the carbonyl group to a methylene group is usually attended by varying amounts of bimolecular reduction yielding high molecular weight byproducts which create a purification problem. The reaction generally requires prolonged periods of time and large volumes of corrosive acids which result in high manufacturing costs. In addition, the material to be reduced and the products are usually insoluble in the aqueous hydrochloric acid reaction medium. This makes necessary the use of a two phase system in which a water immiscible solvent such as toluene is used. The problem of isolating the crude product from the organic layer then arises. This frequently involves stripping the solvent to dryness which cannot be handled readily on a plant scale. A further disadvantage is the fact that zinc-amalgam is required in large quantities. A weight of zinc amalgam five times the substrate weight is commonly employed. Preparation of this amalgam involves treating zinc with mercuric chloride which is an expensive operation due to the cost of the mercuric chloride required, and is also a hazardous one as well. Mercury and its salts are highly toxic substances.

The Wolff-Kishner type of reduction has been employed for the reduction of ketones to hydrocarbons. Again this is a process which does not lend itself readily to commercial operation. This method involves the use of hydrazine hydrate and strong alkali at about 180–200° C. which is not only hazardous on a large scale but is also inconvenient. Therefore, the need exists for a process for the reduction of 1,2,3,4-tetrahydro-4-oxo-1-naphthoic acid to 1,2,3,4-tetrahydro-1-naphthoic acid which is free of the above disadvantages.

In accordance with the present invention 1,2,3,4-tetrahydro-4-oxo-1-naphthoic acid may be hydrogenated to form 1,2,3,4-tetrahydronaphthoic acid in high yield and by a process which is convenient and simple to carry out on a commercial scale. The catalytic hydrogenation of ketones to hydrocarbons is known in the art and has been applied previously in a number of examples. However, none of these processes is satisfactory for the present conversion on a commercial scale. In general, these known catalytic methods involve either noble metal catalysts or various copper containing catalysts such as copper chromium oxide. The noble metal catalysts, of course, are very expensive and their use on a commercial scale is ordinarily avoided if possible since elaborate recovery procedures are necessary. Copper chromium oxide has been used on an industrial scale, but its use has certain disadvantages. Preparation of the catalyst is subject to many variables and meticulous control in its production is required. Hydrogenation processes using this catalyst customarily require the use of inconveniently high temperatures and pressures, considerably higher than are required, for example, with Raney nickel or other nickel catalysts. Unfortunately, Raney nickel catalysts have not proven to be generally satisfactory for the hydrogenation of ketones to hydrocarbons. At best, only moderate yields have been obtained and various byproducts that are difficult to separate are commonly produced. Surprisingly, it has now been found that Raney nickel works exceedingly well for the hydrogenation of 1,2,3,4-tetrahydro-4-oxo-1-naphthoic acid to 1,2,3,4-tetrahydro-1-naphthoic acid. Nearly quantitative yields of a readily purified product are obtained under conditions readily attained in the usual industrial hydrogenation equipment.

The valuable process of this invention is preferably carried out by dissolving or suspending the keto acid in a suitable solvent and hydrogenating this solution or suspension in a stirred autoclave in the presence of a Raney nickel catalyst at an elevated temperature and pressure. Various types of common hydrogenation equipment may be employed. Suitable solvents include those which have adequate solvent power for the keto acid and also for the product and which are not subject to hydrogenation under the conditions employed. Suitable solvents include the stable organic liquids such as the lower alkanols, that is those containing less than about six carbon atoms for example ethanol, butanol, isopropanol, and methanol; the aliphatic ethers such as diethyl ether, dibutyl ether, and dipropyl ether, as well as cyclic ethers such as dioxane and tetrahydrofuran. Various hydrocarbon solvents, both aliphatic and aromatic, may also be employed. Some of the more common ones include benzene, toluene, xylene, cyclohexane and octane.

The minimum temperature for carrying out the process depends upon the activity of the catalyst employed. With a moderately active Raney nickel catalyst, the reaction takes place at a satisfactory rate above about 110° C. At this temperature hydrogenation is completed in about five hours. At somewhat lower temperatures, say about 100° C., with the same catalyst the reaction is incomplete even after ten hours. Of course, with more active Raney nickel catalysts, the lower temperatures are applicable. The maximum temperature that may be employed with this catalyst is about 150° to 175° C. At this temperature, hydrogenation of the aromatic ring commences and instead of obtaining the tetrahydronaphthoic acid, more completely hydrogenated products such as the octahydronaphthoic acid are obtained.

In general, the useful temperature range for a given catalyst can be determined by experimentation. The optimum temperature applicable will vary with the particular catalyst employed.

The pressure that is employed for the hydrogenation does not seem to be a critical variable so long as a certain minimum is exceeded. Similar rates of hydrogenation were observed in various runs where the pressure was varied in the range of 500 to 2000 p.s.i. Higher pressures may be employed but no further advantage is derived therefrom.

When a solvent is employed, as is the case in a preferred embodiment of this invention, recovery of the product ordinarily involves separating the catalyst either by filtering or centrifuging; washing the separated catalyst; and isolating of the product from the so-obtained solution. This can be accomplished either by evaporating the solvent, by various solvent extraction procedures, or by precipitation procedures. Precipitation procedures may employ either the precipitation of an insoluble salt of the acid or the addition of a non-solvent for the tetrahydronaphthoic acid to the solution. In a preferred embodiment of this invention, a lower aliphatic alcohol is employed as the solvent. This has been found convenient since for the use of this intermediate in the preparation of tetrahydrozoline, it is desired first to convert the tetrahydronaphthoic acid to an ester. The acid produced in the hydrogenation step thus can be esterified directly without isolation from the alcoholic solution. Alternatively, if it is desired to isolate the acid, this can be done simply by evaporating the solvent. In this case the product is ordinarily obtained as a syrup which is readily purified by dissolving it in dilute aqueous alkali, filtering the insoluble material, and then precipitating the purified product by treatment of the alkaline filtrate with a mineral acid.

The following examples are given to further illustrate this valuable invention but are not to be considered as limiting it in any way. In fact, resort may be had to many variations without departing from the spirit and scope thereof.

*Example I*

A one liter stirred autoclave was charged with a mixture of 120 g. (0.63 mole) of 1,2,3,4-tetrahydro-4-oxo-1-naphthoic acid, 6 g. of Raney nickel catalyst and 410 ml. of anhydrous ethanol. It was necessary to heat the mixture to effect solution of the acid. The autoclave was then flushed with nitrogen, followed by hydrogen, and then charged to a hydrogen pressure of 1,600 p.s.i.g. and heated at 120° C. for five hours with agitation. The pressure was maintained at 1400–1600 p.s.i.g. during this time by adding more hydrogen. The autoclave was then allowed to cool to room temperature, vented, the contents filtered using a diatomaceous earth filter aid and washed. The filtrate and washes were combined and concentrated in vacuo to a thick syrup. This syrup was then treated at 100° C. for 30 minutes with about 200 ml. of 5 N sodium hydroxide. A small amount of the solvent was then distilled in vacuo to ensure removal of the last traces of ethanol. The resulting aqueous solution was cooled and again filtered to remove fibers and a small amount of insoluble material. The cooled solution was then slowly acidified by treatment with a solution of 300 ml. of concentrated sulfuric acid in about 1.3 l. of water. The product, 1,2,3,4-tetrahydro-1-naphthoic acid, precipitated. It was collected, washed with water, and dried to constant weight in an oven at 50–60° C. It weighed 104 g. (94%) and had a melting point of 79.8–81.2° C. It had a neutralization equivalent of 178 which is in good agreement with the calculated value 176.

*Example II*

A hydrogenation was carried out as in Example I. After the catalyst had been filtered and washed, the combined ethanolic filtrate and washes had a volume of 630 ml. Concentrated sulfuric acid, 18 ml., was added to this solution and the mixture was refluxed for 16 hours. The solvent was then evaporated at reduced pressure and a maximum temperature of 70° C. The residue was dissolved in about 600 ml. of chloroform and the resulting chloroform solution washed in turn with 60 ml. of water, 60 ml. of saturated aqueous sodium bicarbonate solution and finally with an additional 60 ml. of water. The chloroform solution was dried and concentrated and the residue distilled in vacuo. The resulting ethyl 1,2,3,4-tetrahydro-1-naphthoic weighed 114 g. and had a boiling point of 128–135° C. at a pressure of 4.6–5.0 mm. of mercury, $n_D^{25}=1.5208$. The yield, therefore, was 89% based on 1,2,3,4-tetrahydro-4-oxo-1-naphthoic acid. Acidification of the sodium bicarbonate washes yielded 2.9 g. of 1,2,3,4-tetrahydro-1-naphthoic acid which was esterified by charging to a subsequent esterification batch thus effecting a further increase in overall yield.

What is claimed is:

1. A process for producing 1,2,3,4-tetrahydro-1-naphthoic acid comprising hydrogenating 1,2,3,4-tetrahydro-4-oxo-1-naphthoic acid in the presence of a Raney nickel catalyst and a solvent at a pressure of at least 500 pounds per square inch and an elevated temperature of from about 110° to 175° C., said solvent being a stable organic liquid solvent for said acids and being reaction inert under said pressure and temperature conditions.

2. A process as claimed in claim 1 wherein the hydrogenation is carried out substantially in the temperature range 110° to 150° C. and at a pressure of substantially 500 to 2000 pounds per square inch.

3. A process as claimed in claim 1 wherein the 1,2,3,4-tetrahydro-1-naphthoic acid is recovered.

4. A process as claimed in claim 3 wherein recovery of the 1,2,3,4-tetrahydro-1-naphthoic acid comprises the steps of removing the catalyst; removing the solvent; treating the residue with aqueous alkali; acidifying the alkaline solution; and collecting the product.

References Cited in the file of this patent

Adkins: Reactions of Hydrogen, pages 69 and 129–131 (1937).

Dauben et al.: J.A.C.S. 73, page 1399 (1951).

Ansell et al.: Chem. Absts. 45, pages 3365–3366 (1951).